United States Patent
Wang et al.

(10) Patent No.: US 8,780,470 B1
(45) Date of Patent: Jul. 15, 2014

(54) DISK DRIVE ADJUSTING DIGITAL PHASE LOCKED LOOP OVER SECTOR DATA WITH FREQUENCY INDUCED PHASE ERROR MEASURED OVER PREAMBLE

(71) Applicant: Western Digital Technologies, Inc., Irvine, CA (US)

(72) Inventors: Alvin J. Wang, Fremont, CA (US); Manmohan K. Sharma, Cupertino, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/794,501

(22) Filed: Mar. 11, 2013

(51) Int. Cl.
  *G11B 20/20* (2006.01)
(52) U.S. Cl.
  USPC .............................................. 360/26; 360/27
(58) Field of Classification Search
  None
  See application file for complete search history.

(56) References Cited

U.S. PATENT DOCUMENTS

| | | | |
|---|---|---|---|
| 5,283,483 A | 2/1994 | Laber et al. | |
| 6,184,748 B1 | 2/2001 | Rao et al. | |
| 6,307,696 B1 | 10/2001 | Bishop et al. | |
| 6,366,225 B1 | 4/2002 | Ozdemir | |
| 6,636,572 B1 | 10/2003 | Staszewski | |
| 6,775,084 B1 | 8/2004 | Ozdemir et al. | |
| 6,816,328 B2 | 11/2004 | Rae | |
| 6,854,002 B2 | 2/2005 | Conway et al. | |
| 7,054,088 B2 | 5/2006 | Yamazaki et al. | |
| 7,405,894 B2 | 7/2008 | Pan et al. | |
| 7,446,968 B2 | 11/2008 | Giovenzana et al. | |
| 7,515,369 B2 | 4/2009 | Sugawara et al. | |
| 7,773,324 B2 | 8/2010 | Ozdemir | |
| 7,821,731 B2 | 10/2010 | Sutardja et al. | |
| 7,852,589 B2 | 12/2010 | Ikeda et al. | |
| 7,880,992 B2 | 2/2011 | Ozturk et al. | |
| 7,944,313 B1 | 5/2011 | Ying et al. | |
| 7,995,304 B2 | 8/2011 | Ozturk et al. | |
| 8,068,389 B2 | 11/2011 | Kobayashi | |
| 8,199,626 B1 | 6/2012 | Xie et al. | |
| 8,320,512 B2 | 11/2012 | Xia et al. | |
| 2004/0201913 A1* | 10/2004 | Sutardja .......................... | 360/51 |
| 2007/0195445 A1* | 8/2007 | Vanlaanen et al. .............. | 360/51 |

* cited by examiner

*Primary Examiner* — Paul Huber

(57) ABSTRACT

A disk drive is disclosed comprising a head actuated over a disk comprising a sector including a periodic pattern and sector data. The sector is read with the head to generate a read signal which is sampled at a sampling frequency with a signal sampler to generate signal samples. The signal samples representing the periodic pattern are processed to measure a frequency induced phase error based on $k\delta$ where k represents a signal sample index and $\delta$ is a fraction of $2\pi$. The signal samples representing the sector data are processed to generate a data phase error. The data phase error is adjusted in response to the frequency induced phase error to generate an adjusted data phase error, and the signal sampler is controlled in response to the adjusted data phase error.

16 Claims, 3 Drawing Sheets

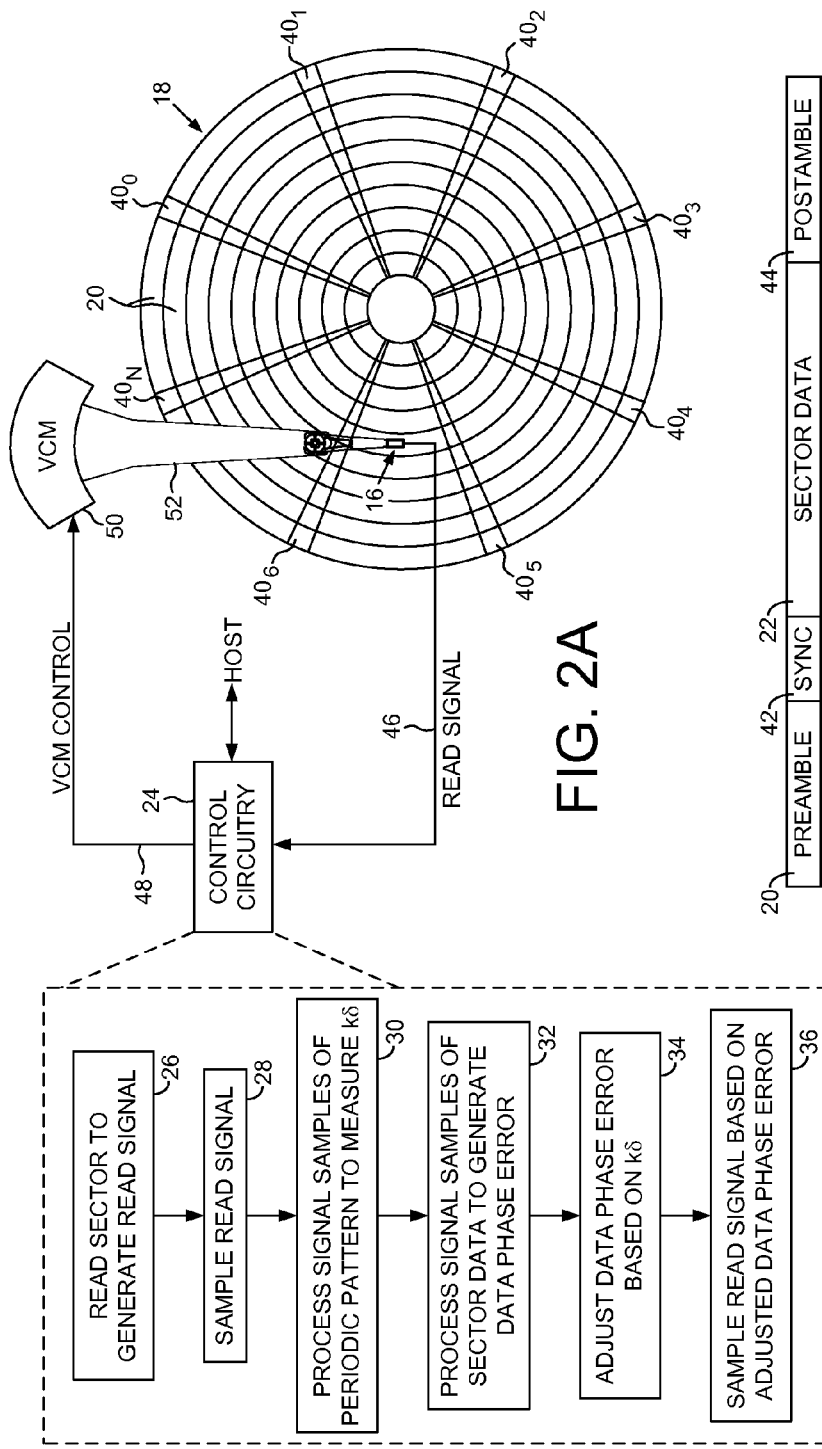

DISK DRIVE ADJUSTING DIGITAL PHASE LOCKED LOOP OVER SECTOR DATA WITH FREQUENCY INDUCED PHASE ERROR MEASURED OVER PREAMBLE

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format comprising a number of servo sectors $6_0$-$6_N$ recorded around the circumference of the disk 2 that define a plurality of servo tracks 4, wherein data tracks are defined relative to the servo tracks (at the same or different radial density). Each servo sector 6, may comprise a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector 6, may further comprise groups of servo bursts 14 (e.g., A, B, C and D bursts), which comprise a number of consecutive transitions recorded at precise intervals and offsets with respect to a servo track centerline. The groups of servo bursts 14 provide fine head position information used for centerline tracking while accessing a data track during write/read operations.

BRIEF DESCRIPTION OF THE DRAWINGS

FIG. 2A shows a disk drive according to an embodiment comprising a head actuated over a disk.

FIG. 2B shows an embodiment of a sector comprising a periodic pattern (a preamble and/or postamble) and sector data.

FIG. 2C is a flow diagram according to an embodiment wherein the signal samples representing the periodic pattern are processed to measure a frequency induced phase error.

DETAILED DESCRIPTION

Figure 1:
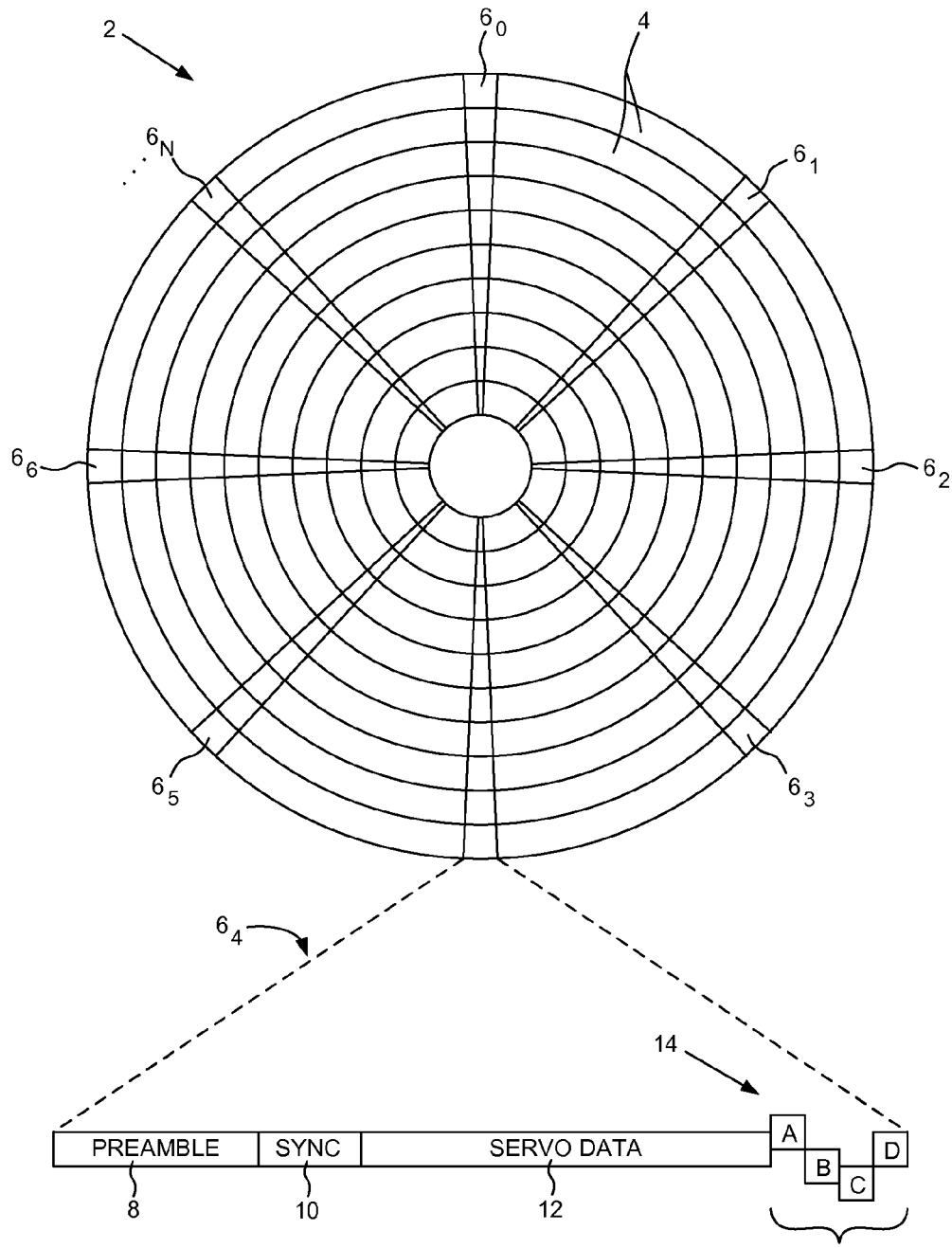
FIG. 1 shows a prior art disk format comprising a plurality of servo tracks defined by embedded servo sectors.

FIG. 2A shows a disk drive according to an embodiment comprising a head 16 actuated over a disk 18 comprising a sector (FIG. 2B) including a periodic pattern (e.g., a preamble 20) and sector data 22. The disk drive further comprises control circuitry 24 operable to execute the flow diagram of FIG. 2C, wherein the sector is read with the head to generate a read signal (block 26) which is sampled at a sampling frequency with a signal sampler to generate signal samples (block 28). The signal samples representing the periodic pattern are processed to measure a frequency induced phase error based on $k\delta$ (block 30) where k represents a signal sample index and $\delta$ is a fraction of $2\pi$. The signal samples representing the sector data are processed to generate a data phase error (block 32). The data phase error is adjusted in response to the frequency induced phase error to generate an adjusted data phase error (block 34), and the signal sampler is controlled in response to the adjusted data phase error (block 36).

In the embodiment of FIG. 2A, the disk 18 comprises a plurality of servo tracks 38 defined by servo sectors $40_0$-$40_N$, wherein data tracks are defined relative to the servo tracks at the same or different radial density. The data tracks are further divided into data sectors, wherein as shown in FIG. 2B the data and servo sectors may comprise a first periodic pattern 20 (e.g., a preamble), a sync mark 42, sector data 22, and a second periodic pattern 44 (e.g., a postamble). The control circuitry 24 processes a read signal 46 emanating from the head 16 to demodulate the servo sectors $40_0$-$40_N$ and generate a position error signal (PES) representing an error between the actual position of the head and a target position relative to a target track. The control circuitry 24 filters the PES using a suitable compensation filter to generate a control signal 48 applied to a voice coil motor (VCM) 50 which rotates an actuator arm 52 about a pivot in order to actuate the head 16 radially over the disk 18 in a direction that reduces the PES. The servo sectors $40_0$-$40_N$ may comprise any suitable head position information, such as a track address for coarse positioning and servo bursts for fine positioning. The servo bursts may comprise any suitable pattern, such as an amplitude based servo pattern (FIG. 1) or a phase based servo pattern.

Figure 3A:
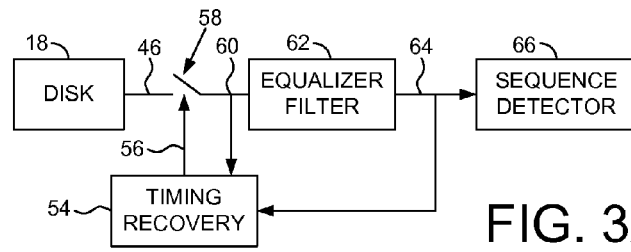
FIG. 3A shows control circuitry according to an embodiment including a timing recovery circuit for controlling a signal sampler.

FIG. 3A shows control circuitry according to an embodiment comprising a timing recovery circuit 54 operable to generate a sampling clock 56 applied to a signal sampler 58 in order to generate the signal samples 60. An equalizer filter 62 filters the signal samples 60 according to a desired response (e.g., a partial response), and the equalized signal samples 64 are processed by a sequence detector 66 to detect the data recorded on the disk. In one embodiment, the timing recovery circuit 54 generates the sampling clock 56 synchronous with the data rate of the recorded data so that the signal samples 60 are substantially synchronous with the data rate.

Figure 3B:
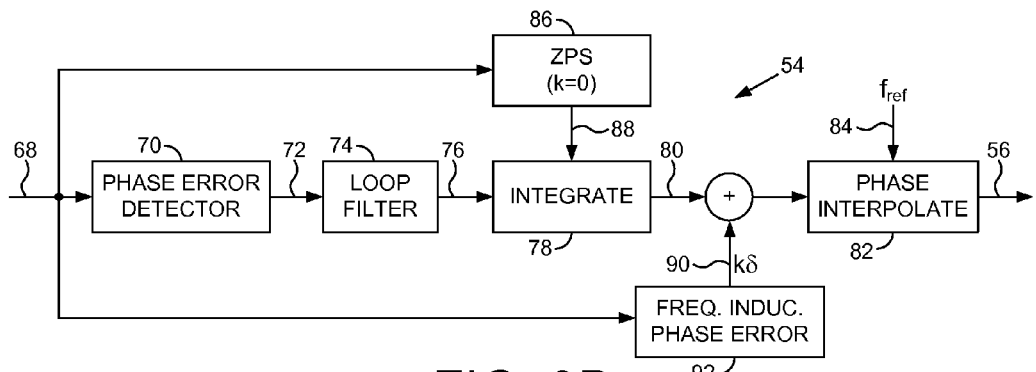
FIG. 3B shows details of a timing recovery circuit according to an embodiment comprising a digital phase-locked loop (DPLL) adjusted by an integrated phase error and by the frequency induced phase error.

FIG. 3B shows a timing recovery circuit 54 according to an embodiment for generating the sampling clock 56 synchronous with the data rate. Signal samples 68 (which may be at the input or output of the equalizer filter 62) are input into a phase detector 70 for detecting a phase error 72 representing a difference between the actual phase of each signal sample 68 and an ideal phase. A loop filter 74 filters the phase error 72, and the output 76 of the loop filter 74 is integrated 78 to generate an integrated phase error 80 (representing the data phase error at block 32 of FIG. 2C). The integrated phase error 80 is used to phase interpolate 82 a reference clock 84 in order to adjust the phase of the sampling clock 56. Accordingly, the timing recovery circuit 54 of FIG. 3B implements a digital phase-locked loop (DPLL) that locks the frequency/phase of the sampling clock 56 onto the frequency/phase of the read signal. In the embodiment of FIG. 3B, the timing recovery circuit 54 comprises a zero-phase start block 86 which computes an initial phase error 88 of the sampling clock 56 relative to the signal samples 68. The initial phase error 88 is used to initialize the integrator 78 which reduces the convergence time of the DPLL.

In one embodiment, if there is a substantial frequency error between the frequency of the reference clock 84 and the data rate of the read signal, the timing recovery circuit 54 of FIG. 3B may be unable to lock onto the read signal. That is, the timing recovery circuit 54 may be unable to track the phase error induced by a substantial frequency error caused, for example, by a vibration perturbing the rotation frequency of the disk 18. Accordingly, in one embodiment a frequency induced phase error 90 is learned at block 92 of FIG. 3B while reading a periodic pattern of a sector (e.g., preamble 20), wherein the frequency induced phase error 90 is used to adjust the integrated phase error 80, thereby enabling the timing recovery circuitry 54 to lock onto the frequency/phase of the read signal.

In one embodiment, reading the periodic signal (e.g., preamble 20) of a sector results in a read signal in the form of a sine wave having a frequency $f_0$. The sine wave may be sampled at a frequency $(1+\Delta)f_0$, where $\Delta$ represents the frequency error between the frequency of the sine wave and the frequency of the reference clock 84. The phase error (as a fraction of $2\pi$) between $f_0$ and the sampling frequency $(1+\Delta)f_0$ manifests as the accumulation of $\delta$, where:

$$\delta = \frac{-\Delta}{1+\Delta}.$$

That is, the frequency induced phase error introduced at each signal sample is represented as $\delta$, and therefore the total frequency induced phase error at any given signal sample index k is represented as $k\delta$. Accordingly, in one embodiment the fraction $\delta$ is learned while reading the periodic pattern (e.g., preamble 20) of a sector, and then the fraction $\delta$ is used to generate the frequency induced phase error 90 for each signal sample of the sector data 22.

Figure 3C:
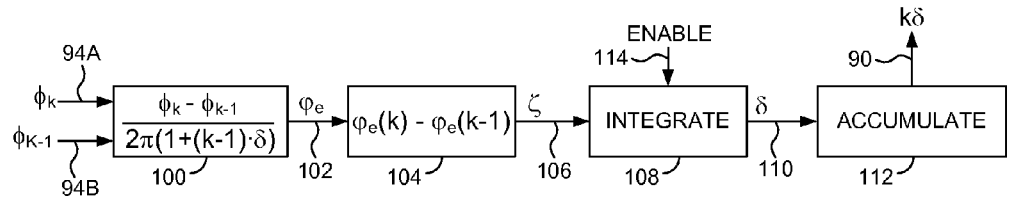
FIG. 3C shows control circuitry according to an embodiment for generating the frequency induced phase error.
Figure 3D:
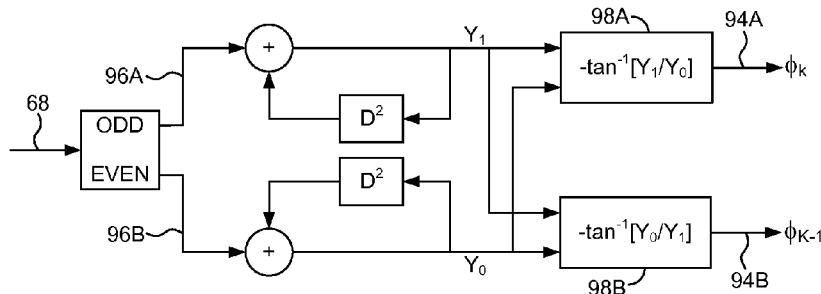
FIG. 3D shows control circuitry according to an embodiment for measuring a phase estimate of a signal sample of the periodic pattern at signal sample index k.

In one embodiment, when reading the periodic pattern (e.g., preamble 20) a phase estimate $\phi_k$ 94A of one of the signal samples 68 at index k is generated by computing a single frequency discrete Fourier transform (DFT) at frequency $f_0$ using the control circuitry shown in FIG. 3D. The odd signal samples 96A are extracted and the even signal samples 96B are extracted from the signal samples 68. The odd/even signal samples are passed through a $1/1+D^2$ filter to accumulate the even/odd sequences as well as average out signal noise. A first block 98A processes the accumulated and filtered odd/even sequences $Y_1$ and $Y_0$ to estimate a phase $\phi_k$ 94A of the signal samples 68 at index k, and a second block 98B processes the accumulated and filtered odd/even sequences $Y_1$ and $Y_0$ to estimate a phase $\phi_{k-1}$ 94B of the signal samples 68 at index k−1.

If the preamble 20 comprises a 2T pattern, and there is no phase error or frequency error ($\Delta$=0) when sampling the read signal 46, then the normalized amplitude of the signal samples representing the preamble 20 will be (++−−++−−++−− . . . ) and the change in phase between consecutive signal samples 68 will be 0.25 of $2\pi$. The phase error $\phi_e(k)$ between two consecutive signal samples may therefore be represented as:

$$\varphi_e(k) = \frac{\phi_k - \phi_{k-1}}{2\pi(1+(k-1)\cdot\delta)} + (-1)^k \cdot 0.25$$

which is zero when the frequency error is zero ($\Delta$=0). The above equation is computed at block 100 in FIG. 3C to generate a phase error $\phi_e(k)$ 102 at each signal sample index k.

The instant contribution to the fraction $\delta$ 110 at signal sample index k may be represented as:

$$\xi(k)=\phi_e(k)-\phi_e(k-1)+(-1)^k/2$$

The above equation is computed at block 104 of FIG. 3C to generate $\xi(k)$ 106, and as each new signal sample 68 is processed, each new value $\xi(k)$ 106 is integrated 108 which causes the fraction $\delta$ 110 to converge toward a steady state value. An accumulator 112 accumulates the fraction $\delta$ 110 to generate the frequency induced phase error $k\delta$ 90 at each signal sample index k.

In one embodiment, the integrator 108 of FIG. 3C is enabled by control signal 114 while reading the periodic pattern (e.g., preamble 20) of a sector, and disabled while reading the sync mark 42 and sector data 22. That is, the fraction $\delta$ 110 is learned (updated) while reading the periodic pattern (e.g., preamble 20), and then the learned fraction $\delta$ 110 is held constant while reading the sync mark 42 and sector data 22. In one embodiment, the control signal 114 may disable the integrator 108 when the head 16 approaches the end of the preamble 20 since the beginning of the sync mark 42 is unknown.

In one embodiment, the sector may comprise a postamble 44 as shown in FIG. 2B, wherein the fraction $\delta$ 110 may be further updated after reading the sector data 22. The sector may comprise a data sector of a data track, or a servo sector 40, of a servo track. In one embodiment, a first fraction $\delta_{DATA}$ may be learned for the data sectors of a data track, and a second fraction $\delta_{SERVO}$ may be learned for the servo sectors of a servo track. In one embodiment, during an access operation (write or read) after the head 16 settles onto the target data track, the periodic pattern (e.g., preamble 20) in a number of data sectors preceding the target data sectors may be processed in order to learn the fraction $\delta$ 110 prior to reaching the target data sectors of the access operation. When accessing the target data sectors, the fraction $\delta$ 110 may be further updated when reading the periodic pattern of each target data sector (e.g., preamble 20 and/or postamble 44). In this manner, the frequency induced phase error 90 is essentially removed from the phase error 72 of the DPLL, thereby enabling the DPLL to lock onto the read signal even in the presence of a substantial frequency error between the reference clock 84 and the data rate of the read signal.

In one embodiment, the signal sample index k is reset to zero by the zero-phase start block 86 of FIG. 3B each time the zero-phase start is computed at the beginning of a preamble 20. That is, after executing the zero-phase start, the frequency induced phase error 90 for the next signal sample of the preamble 20 is 1·$\delta$, and for the next signal sample 2·$\delta$, and so on. If there is an error in the fraction $\delta$, it will manifest in the difference $\zeta(k)$ 106, and this error will eventually integrate to zero. Since $\xi$ is a fraction of $2\pi$, the accumulated fraction $k\delta$ will automatically reset when it exceeds $2\pi$. When processing the first signal sample of the sync mark 42, the frequency induced phase error 90 will be generated based on $k\delta$, where k represents the signal sample index relative to the signal sample index k=0 which is reset by the zero-phase start block 86.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A disk drive comprising:
    a disk comprising a sector comprising a periodic pattern and sector data;
    a head actuated over the disk; and
    control circuitry comprising a signal sampler, the control circuitry operable to:
        read the sector with the head to generate a read signal;
        sample the read signal at a sampling frequency with the signal sampler to generate signal samples;
        process the signal samples representing the periodic pattern to measure a frequency induced phase error based on kδ, where k represents a signal sample index and δ is a fraction of 2π;
        process the signal samples representing the sector data to generate a data phase error;
        adjust the data phase error in response to the frequency induced phase error to generate an adjusted data phase error; and
        control the signal sampler in response to the adjusted data phase error.

2. The disk drive as recited in claim 1, wherein the control circuitry is further operable to:
    interpolate a reference clock to generate an interpolated sample clock in response to the adjusted data phase error; and
    control the signal sampler in response to the interpolated sample clock.

3. The disk drive as recited in claim 2, wherein the control circuitry is operable to generate the adjusted data phase error by adding the frequency induced phase error to the data phase error.

4. The disk drive as recited in claim 2, wherein:

$$\delta = \frac{-\Delta}{1+\Delta}$$

where $\Delta$ represents a frequency error between a frequency $f_0$ of the periodic pattern and a reference sampling frequency $f_1$ of the reference clock.

5. The disk drive as recited in claim 4, wherein the control circuitry is further operable to process the signal samples representing the periodic pattern to measure the frequency induced phase error by at least:
    measuring a first phase error $\phi_e(k-1)$ at signal sample index k−1;
    measuring a second phase error $\phi_e(k)$ at signal sample index k; and
    computing a value $\xi(k)$ based on a difference between the first and second phase errors.

6. The disk drive as recited in claim 5, wherein the control circuitry is further operable to integrate the values $\zeta(k)$ to generate $\delta(k)$.

7. The disk drive as recited in claim 5, wherein the control circuitry is further operable to measure the second phase error $\phi_e(k)$ at signal sample index k based at least partly on:

$$\varphi_e(k) = \frac{\phi_k - \phi_{k-1}}{2\pi(1 + (k-1)\cdot\delta)}$$

where $\phi_k$ represents a phase estimate of one of the signal samples of the periodic pattern at signal sample index k.

8. The disk drive as recited in claim 7, wherein the control circuitry is further operable to generate:

$$\phi_k = -\tan^{-1}\left[\frac{Y_1}{Y_0}\right] \quad \phi_{k-1} = -\tan^{-1}\left[\frac{Y_0}{Y_1}\right]$$

where $Y_0$ represents accumulated even-indexed signal samples of the periodic pattern and $Y_1$ represents accumulated odd-indexed signal samples of the periodic pattern.

9. A method of operating a disk drive comprising a head actuated over a disk comprising a sector comprising a periodic pattern and sector data, the method comprising:
    reading the sector with the head to generate a read signal;
    sampling the read signal at a sampling frequency with a signal sampler to generate signal samples;
    processing the signal samples representing the periodic pattern to measure a frequency induced phase error based on kδ, where k represents a signal sample index and δ is a fraction of 2π;

processing the signal samples representing the sector data to generate a data phase error;

adjusting the data phase error in response to the frequency induced phase error to generate an adjusted data phase error; and controlling the signal sampler in response to the adjusted data phase error.

10. The method as recited in claim 9, further comprising:

interpolating a reference clock to generate an interpolated sample clock in response to the adjusted data phase error; and controlling the signal sampler in response to the interpolated sample clock.

11. The method as recited in claim 10, further comprising generating the adjusted data phase error by adding the frequency induced phase error to the data phase error.

12. The method as recited in claim 10 wherein:

$$\delta = \frac{-\Delta}{1+\Delta}$$

where $\Delta$ represents a frequency error between a frequency $f_0$ of the periodic pattern and a reference sampling frequency $f_1$ of the reference clock.

13. The method as recited in claim 12, further comprising processing the signal samples representing the periodic pattern to measure the frequency induced phase error by at least:

measuring a first phase error $\phi_e(k-1)$ at signal sample index k−1;

measuring a second phase error $\phi_e(k)$ at signal sample index k; and computing a value $\xi(k)$ based on a difference between the first and second phase errors.

14. The method as recited in claim 13, further comprising integrating the values $\xi(k)$ to generate $\delta(k)$.

15. The method as recited in claim 13, further comprising measuring the second phase error $\phi_e(k)$ at signal sample index k based at least partly on:

$$\varphi_e(k) = \frac{\phi_k - \phi_{k-1}}{2\pi(1 + (k-1)\cdot\delta)}$$

where $\phi_k$ represents a phase estimate of one of the signal samples of the periodic pattern at signal sample index k.

16. The method as recited in claim 15, further comprising generating:

$$\phi_k = -\tan^{-1}\left[\frac{Y_1}{Y_0}\right] \quad \phi_{k-1} = -\tan^{-1}\left[\frac{Y_0}{Y_1}\right]$$

where $Y_0$ represents accumulated even-indexed signal samples of the periodic pattern and $Y_1$ represents accumulated odd-indexed signal samples of the periodic pattern.

* * * * *